(12) United States Patent
Chamseddine et al.

(10) Patent No.: US 7,917,683 B1
(45) Date of Patent: *Mar. 29, 2011

(54) METHOD AND SYSTEM FOR UTILIZING MULTIPLE STORAGE DEVICES

(75) Inventors: Ahmad Chamseddine, Round Rock, TX (US); Brian Bruce, Austin, TX (US)

(73) Assignee: Augmentix Corporation, Austin, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/175,490

(22) Filed: Jul. 18, 2008

Related U.S. Application Data

(60) Provisional application No. 60/961,595, filed on Jul. 23, 2007.

(51) Int. Cl.
  *G06F 13/00* (2006.01)
(52) U.S. Cl. .......................... 710/315; 710/310
(58) Field of Classification Search ................. 710/310, 710/315; 711/154, 163, 202
  See application file for complete search history.

(56) References Cited

U.S. PATENT DOCUMENTS

| | | |
|---|---|---|
| 5,708,668 A | 1/1998 | Styczinski |
| 6,834,324 B1 | 12/2004 | Wood |
| 6,973,516 B1 | 12/2005 | Athanas et al. |
| 7,107,385 B2 | 9/2006 | Rajan |
| 7,213,095 B2 * | 5/2007 | Middleton et al. ............ 710/310 |
| 7,472,219 B2 * | 12/2008 | Tamura et al. ............... 711/103 |
| 2002/0194428 A1 | 12/2002 | Green |
| 2004/0123017 A1 | 6/2004 | Henry et al. |
| 2005/0010722 A1 | 1/2005 | Chen |
| 2005/0125602 A1 * | 6/2005 | Ehrlich ........................ 711/112 |
| 2005/0125603 A1 * | 6/2005 | Ehrlich ........................ 711/112 |
| 2005/0132040 A1 | 6/2005 | Ellis et al. |
| 2005/0157752 A1 | 7/2005 | Takase et al. |
| 2006/0224852 A1 | 10/2006 | Kottomtharayil |
| 2006/0248292 A1 | 11/2006 | Suresh |
| 2007/0074292 A1 | 3/2007 | Mimatsu |
| 2007/0250662 A1 * | 10/2007 | Yoshida et al. ............... 711/113 |
| 2010/0070688 A1 * | 3/2010 | Lin ............................... 711/103 |

OTHER PUBLICATIONS

Office Action mailed in U.S. Appl. No. 12/048,256, dated Dec. 22, 2009, 8 pgs.
Office Action mailed in U.S. Appl. No. 12/048,271, dated Feb. 4, 2010, 8 pgs.
Office Action for U.S. Appl. No. 12/175,496 mailed Apr. 1, 2010, 12 pgs.
Office Action for U.S. Appl. No. 12/175,496 mailed Aug. 19, 2010, 6 pgs.
Office Action for U.S. Appl. No. 12/048,271 mailed Aug. 31, 2010, 12 pgs.
Office Action for U.S. Appl. No. 12/048,256 mailed Sep. 2, 2010, 12 pgs.
Office Action Mailed Feb. 2, 2011 in U.S. Appl. No. 12/048,256. 10 pgs.
Office Action Mailed Feb. 2, 2011 in U.S. Appl. No. 12/048,271. 10 pgs.

\* cited by examiner

*Primary Examiner* — Glenn A Auve
(74) *Attorney, Agent, or Firm* — Sprinkle IP Law Group

(57) ABSTRACT

Systems, devices and methods for interfacing a single bus with multiple buses invisibly to devices using the single bus are presented. More specifically, in one embodiment an I/O bus may be interfaced with multiple other I/O buses of the same or different formats. Commands may be received on one I/O bus and invisibly to a computing device or processor which issues the commands, translated into a set of commands configured to effectuate a received command in conjunction with storage media coupled to the other I/O buses. These storage media may comprise different types of storage media such that data designated as critical may be stored on an appropriate storage media.

17 Claims, 7 Drawing Sheets

METHOD AND SYSTEM FOR UTILIZING MULTIPLE STORAGE DEVICES

RELATED APPLICATIONS

This application claims a benefit of priority to the filing date of U.S. Provisional Patent Application Ser. No. 60/961,595 by Brian Bruce and Ahmad Chamseddine, entitled "Method and System for Utilizing Multiple Storage Devices" filed on Jul. 23, 2007, the entire contents of which are hereby expressly incorporated by reference for all purposes.

TECHNICAL FIELD

Embodiments of the invention relate generally to the use of storage devices. More particularly, embodiments of the invention relate to implementing the use of multiple storage devices in conjunction with one another to achieve one or more desired objectives in a particular context. Even more specifically, certain embodiments of the invention pertain to the use of different types of storage devices in conjunction with another to increase, for example, data protection.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

These types of constraints may center around processing constraints particular to an environment or context in which data is being processed or utilized, space constraints within such an environment, cost constraints placed on the hardware or software used to process, manage or otherwise store data, or other constraints altogether may impede the ability to achieve desirable levels of protection with respect to important data. It would be desirable therefore, to be able to achieve a desired level of data protection utilizing solutions which may account for, or be less affected by, certain of these constraints.

SUMMARY

Systems, devices and methods for interfacing a single bus with multiple buses invisibly to devices using the single bus are presented where different types of storage mediums are present. More specifically, in one embodiment an I/O bus may be interfaced with multiple other I/O buses of the same or different formats. Commands may be received on the first I/O bus and invisibly to a computing device or processor which issues the command, translated into a set of commands configured to effectuate the received command in conjunction with storage media coupled to the other I/O buses. These storage media may comprise different types of storage media such that data designated as critical may be stored on an appropriate storage media.

Embodiments of the invention disclosed herein can be implemented all or in part by logic, including hardware or by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

Certain technical advantages may be obtained through the use of embodiments of the present invention. More specifically, embodiments of the present invention may allow increased reliability of critical data by allowing critical data to be stored on a more reliable storage media while simultaneously providing increased capacity as the reliable storage media may be utilized in conjunction with a storage media with relatively greater capacity. Furthermore, increased throughput may also be realized in conjunction with the obtaining increased reliability by allowing multiple storage media to be utilized in conjunction with certain buses (where only one drive may have been utilized previously) to minimize latency on the bus and maximize throughput.

Additionally, embodiments of the present invention may be operating system and bus agnostic, any bus can be utilized and increased reliability, security, extra capacity, etc. can be implemented or obtained regardless of a native bus format. Thus, functionality provided by embodiments of the present invention may be obtained without modification to drivers or other software on native systems.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented at least in part using suitable computer-executable instructions that may reside on a computer readable medium (e.g., a HD), hardware circuitry or the like, or any combination. Before proceeding with the remainder of the disclosure it may be helpful to review U.S. patent application Ser. No. 12/048,256, entitled "Method and System and Apparatus for Use in Data Storage", Brian Bruce and Ahmad Chamseddine, filed Mar. 14, 2008, U.S. patent application Ser. No. 12/048,271, entitled "Method and System for a Storage Device", Brian Bruce and Ahmad Chamseddine, filed Mar. 14, 2008 and U.S. patent application Ser. No. 12/175,496, entitled "Method and System for A Storage Device", Brian Bruce and Ahmad Chamseddine, filed Jul. 18, 2008, all of which are incorporated fully herein by reference.

As discussed above, data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

Figure 1:
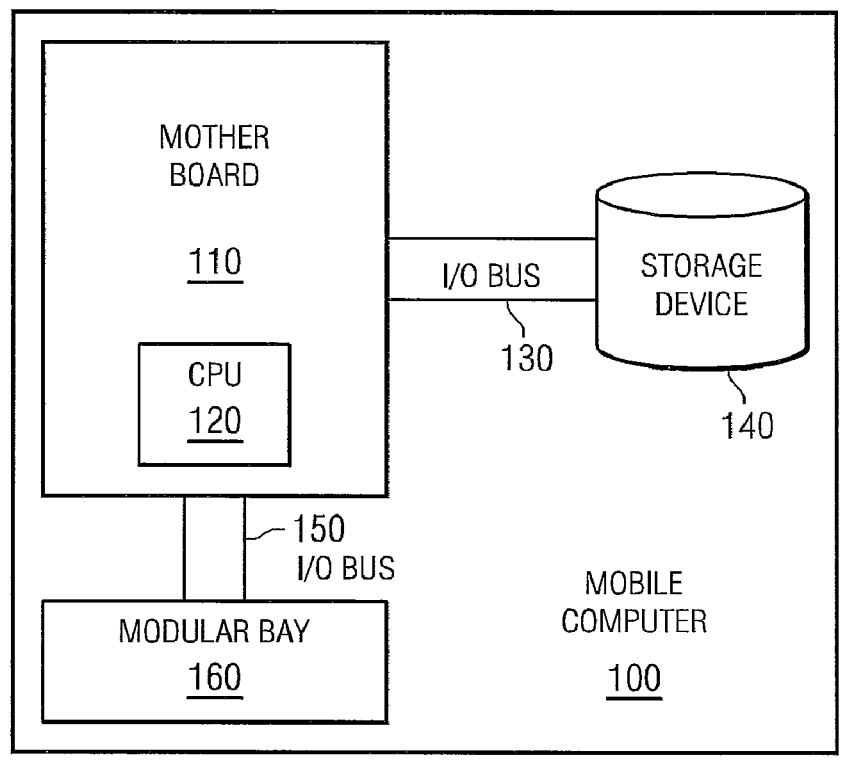
FIG. 1 is a block diagram of one embodiment of a mobile computer.

This tension may be better understood with reference to FIG. 1 which depicts a high level overview of one embodiment of an architecture for a mobile computer (e.g. also sometimes referred to as a notebook or laptop computer). A mobile computer 100 comprises a mother board 110 with a Central Processing Unit (CPU) 120 where the mother board is coupled to a storage device 140 (e.g. a hard disk drive, solid state storage such as flash memory or the like, media library of tape drives, other type of storage media such as disk platters, etc., the terms storage device and storage media will be used interchangeably throughout) through an I/O bus 130 (e.g. an ATA bus, such as a SATA or PATA bus, a PCI bus, a SCSI bus or any other type of bus). Thus, data processed by, or otherwise utilized in conjunction with, mobile computer 100 may be stored in storage device 140.

However, storage device 140 may only be of a certain capacity. In other words current technical limitations of the storage device may only allow a particular type of storage device 140 to store a certain amount of data (referred to as the capacity of the storage device). For example, the largest capacity hard disk drive may be around 750 gigabytes. Part and parcel with this limitation, the capacity of storage device 140 may further be limited by the physical constraints imposed by the packaging of mobile computer 100. There may only be a limited amount of space in which to place storage device 140. In many cases, this additional limitation further constrains the capacity of storage device 140 which may be utilized in this physical package (as the physical size of a storage device may be related to its capacity). For example, the largest disk drive that is currently in use in mobile computers is around 160 gigabytes.

Consequently, the amount of data which may be stored in conjunction with mobile computer 100 is limited by the capacity of storage device 140. This limitation exists, in part, because in most cases I/O bus 130 may only allow (e.g. is configured or designed to operate with) one storage device to be coupled to the I/O bus 130. Thus, the capacity of storage device 140 (which itself may be constrained by technological limitations or the physical limitations imposed by the packaging of mobile computer 100) may be the biggest gating factor in the amount of data which may be stored by mobile computer 100.

The utilization of only one storage device 140 may also give rise to other conflicts. For example, in most cases the largest capacity disk drive for use in mobile computers, as discussed above, is around 160 gigabytes. This type of disk drive is a spinning media type of storage device. In other words, a set of spinning platters is used to store and retrieve data. While somewhat secure this type of storage device is relatively prone to data loss or failure compared with other types of storage media such as solid state storage devices. Thus, in certain cases users of mobile computer 100 may desire to use a disk drive as storage media 140 to increase the amount of data that may be stored. Other users of mobile computer 100 may, however, be dealing with highly critical data and desire to use a solid state (or other more reliable) storage device as storage device 140 to enhance the protection of such data. Both of these options entail a large degree of compromise, if more capacity is desired a disk drive may be chosen as storage device 140, compromising the reliability of data stored on storage media 140 while if more reliability is desired solid state storage may be chosen for storage device 140, compromising the amount of storage available.

Mobile computer 100 may, however, also comprise a second I/O Bus 150 coupled to mother board 110, where the second I/O Bus 150 interfaces with a modular bay 160. A variety of devices may be inserted into (e.g. interfaced with), or used in conjunction with, modular bay 160. For example, a CD or DVD drive may be utilized in conjunction with modular bay 160, a floppy disk drive or another type of storage device such as a hard disk or the like may also be utilized in conjunction with modular bay 160. Consequently, in order to expand the amount of data which may be stored in conjunction with mobile computer 100 or utilize another type of storage device to increase data reliability, in many cases modular bay 160 may be utilized in conjunction with a second storage device in addition to storage device 140. Utilizing the modular bay 160 of mobile computer 100 may, however, preclude the use of modular bay 160 for interfacing with another desired device (e.g. DVD or CD drive), may entail constant swapping between the second storage device and another desired device or may require a user to carry multiple additional devices.

Figure 2:
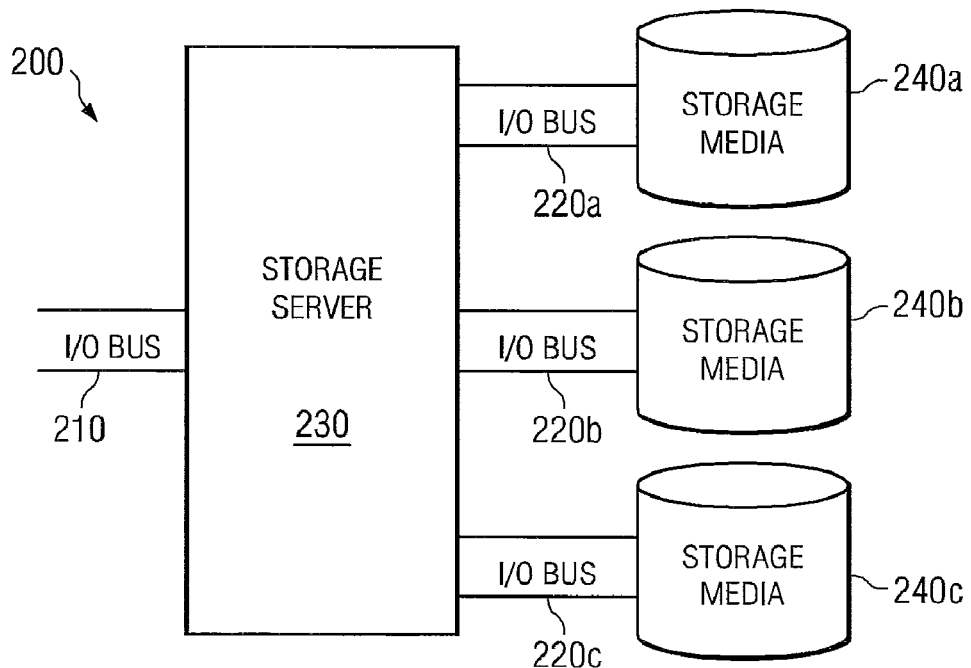
FIG. 2 is a block diagram of one embodiment of a storage server.

Similar types of problems may present themselves in other computing devices or systems which utilize storage devices, such as enterprise servers, storage servers, storage area networks (SANs), network attached storage (NAS) systems, or the like. These types of problems may be better illustrated with reference to FIG. 2 which depicts a block diagram of one embodiment of a computer storage system. Storage system 200 comprises a storage server 230 which receives commands or instructions over I/O bus 210, which may be a type of serial bus such as fiber channel, SCSI or the like, but may also be any type of I/O bus known in the art. Based on the commands or instructions received over I/O bus 210, storage server 230 may communicate with one or more of storage devices 240 (e.g. hard disk drives, tape drives, optical drives, solid state storage devices, etc.) to write, read or otherwise operate on, data associated with those storage devices 240. These communications may take over an I/O bus 220 corresponding to the storage device 240, where each of these I/O buses 220, may in turn, be different, for example I/O bus 220*a* may be a SCSI bus, I/O Bus 220*b* may be a serial ATA bus, etc.

In most cases, however, no matter the type of I/O bus utilized, the I/O bus 220 may limited to being coupled only to one storage device 240 or type of storage device 230 (e.g. a storage device may comprise multiple physical tape drives or other storage mediums). As can be seen, this limitation may constrain the storage associated with storage server 230 to the number of I/O buses 220 associated with storage router 230 or the type and size of storage devices 240 associated with each of I/O buses 220 similarly to the limitations described above with respect to a mobile computer.

To remedy the aforementioned deficiencies, problems and limitations, among others, attention is now directed to systems, methods and devices for interfacing a single bus with multiple buses invisibly to devices using the single bus. By allowing multiple buses to be interfaced to the single bus, a number of storage devices may be coupled to each of the buses where these storage devices may be of different types, greatly increasing both the maximum storage capacity and the reliability of critical data stored on one of the storage devices relative to the coupling of only a single storage device to single bus, without using any additional buses or slots.

Advantageously, in one embodiment, this increased capacity or reliability may be obtained substantially without alterations to other hardware or software of systems with which it utilized, and to that hardware or software the multiple buses (and multiple attached storage devices of different types) may appear as a single bus and a single storage device.

Figure 3:
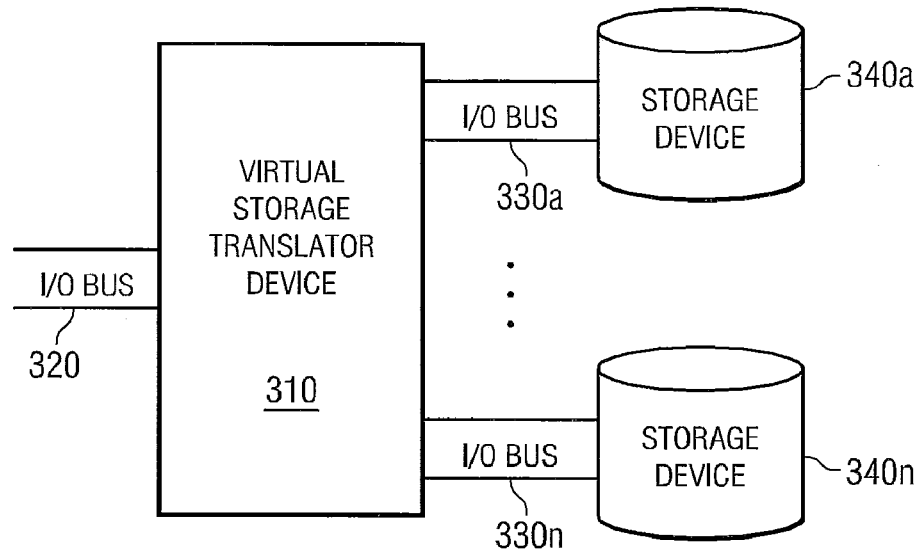
FIG. 3 is a block diagram of one embodiment of a virtual translator storage device.

Moving now to FIG. 3, a block diagram for one embodiment of a system for interfacing multiple buses with a single bus is depicted. More specifically, virtual storage translator device 310 may allow a primary I/O bus 320 to be interfaced with multiple secondary I/O buses 330. I/O bus 320 may be almost any type of bus known in the art, such a SATA or PATA bus. Virtual storage translator device 310, may be a standalone ASIC, a field programmable gate array (FPGA), a circuit board comprising one or more ASICs operable to execute computer readable instructions, a set of computer readable instructions, some combination of hardware and software, etc. In one embodiment, virtual storage translator device 310 may use one or more ASICs such as the Silicon Image Si5723 Storage Processor.

This virtual storage translator device 310 is operable to receive commands or instructions (used interchangeably herein) on primary I/O bus 320 and translate or map these commands or instructions such that they are effectuated with respect to storage devices 340 on secondary I/O buses 330, where secondary I/O buses 350 may each be a different type of I/O bus (e.g. SATA, PATA, SCSI, FC, etc.) and secondary I/O buses 330 may be the same or different from primary I/O bus 320. This translator or mapping may for example, entail tracking where (for example, on which storage device 340) various files are stored or translating commands or instructions in one protocol to equivalent commands or instructions in another protocol.

Furthermore, this translator or mapping process may be accomplished seamlessly or invisibly with respect to a computing device or processor which issues the commands or instruction over I/O bus 320. In other words, in some embodiments, to a computing device interfacing with I/O bus 320 it appears as if a single storage device is present on I/O bus 320 where this single storage device may have the capacity of the combined capacity of the storage devices 340 coupled to each of I/O buses 330.

Figure 4A:
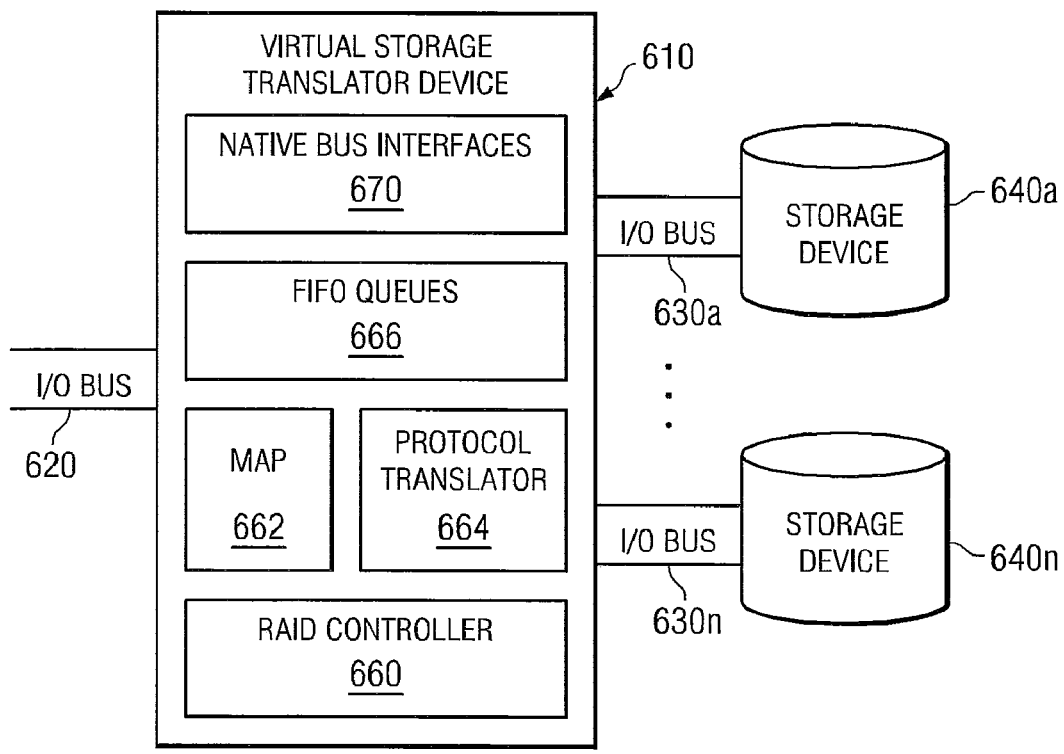
FIG. 4A is a block diagram of one embodiment of a virtual translator storage device.

A more detailed depiction of one embodiment of a system for interfacing multiple buses with a single bus is depicted is depicted in FIG. 4A. More specifically, virtual storage translator device 610 may allow a primary I/O bus 620 to be interfaced with multiple secondary I/O buses 630. I/O bus 620 may be almost any type of bus known in the art, such a serial, SATA or PATA bus. Virtual storage translator device 610, includes RAID controller 660 which may be hardware (e.g. on an ASIC), a portion of the hardware or ASIC comprising virtual storage translator device 610, computer readable instructions on a computer readable media, or some combination. RAID controller 660 may be operable to implement one or more RAID levels (e.g. RAID levels 0, 1, 3, 4, 5, 6 or any nested RAID levels, etc.), multi-RAID modes (e.g. implementations which create virtual volumes and balance the benefits of capacity and protection) cascaded storage devices and the like. In other words, in one embodiment, RAID controller 660 handles the management of any RAID implementation in conjunction with the storage devices coupled to secondary I/O buses 630, performing any parity calculations required by an implemented level RAID level or executing other processing utilized for the RAID implementation.

This management may, in one embodiment, include maintaining one or more first in first out (FIFO) queues 666 for buffering or holding received commands until they are processed and map 662 which is a map between the addressing utilizing in conjunction with commands issued over I/O bus 620 and the storage of data with respect to storage media 640. For example, if RAID controller is implementing RAID 0 with respect to storage media 640, all of storage media 640 may appear as one contiguous set of addresses to users of I/O bus 620 and thus commands over I/O bus 620 may attempt to store or otherwise access data according to these contiguous addresses. To implement RAID 0, however, this data may be stored in storage media according to a different addressing scheme or at different locations than those referred to by command received over I/O bus 620. Thus, map 662 may correlate or otherwise associate addresses or locations of the type or format received over I/O bus 620 with addresses or locations in one or more of storage media 640.

Map 662 may also be utilized to ensure that critical data is stored on an appropriate storage device 640. Map 662 may comprise a set of address corresponding to one or more storage devices 640 on which critical data is to be stored. Thus, when a command received over I/O bus 620 indicates that stored data is critical this data may be stored at one of the address corresponding to one of the storage devices 640 on which critical data should be stored. Alternatively, map 662 may comprise a set of addresses corresponding to the addressing utilized in conjunction with commands issued over I/O bus 620 where the set of address correspond to critical data. When a command is received over I/O bus 620 to store data at an address if the referenced address is within the set of address maintained by map 662 which correspond to critical data the received data may be stored at one of the set of addresses corresponding to the one or more storage devices on which critical data is to be stored.

Thus, virtual storage translator device 610 may be operable to receive commands or instructions on primary I/O bus 620 and translate these commands or instructions such that they are effectuated with respect to storage device 640 on secondary I/O buses 630 or to receive responses or data on a secondary I/O bus 630 and translate the response or data such that it can be communicated to a recipient (e.g. issuer of a command) on primary I/O bus 620, where secondary I/O buses 630 may each be a different type of I/O bus (e.g. SATA, PATA, SCSI, FC, etc.) and secondary I/O buses 630 may be the same or different from primary I/O bus 620. The translation of these commands or responses from the protocol in which they are received on a bus (e.g. primary I/O bus 620 or a secondary I/O bus 630) to a suitable protocol may be accomplished by using native bus interfaces 670 (e.g. an interface corresponding to primary I/O bus 620 or one or more of secondary I/O buses 630) and protocol translator 664.

Additionally, virtual storage translator device 610 is operable to ensure that certain critical data may be stored on an appropriate storage device 640. The storage of critical data on a particular storage device 640 may be accomplished seamlessly or invisibly with respect to a computing device or processor which issues the commands or instruction over I/O bus 620. In other words, in some embodiments, to a computing device interfacing with I/O bus 620 it appears as if a single storage device of a single type is present on I/O bus 620. Portions of the functionality utilized to implement all or a portion of the described functionality such as map 662 or RAID functionality, including RAID controller 660, map 662, FIFO queues 666, protocol translator 664 or native bus interfaces 670 may utilize a set of computer readable instructions of one or more ASICs such as the Silicon Image Si5723 Storage Processor.

Figure 4B:
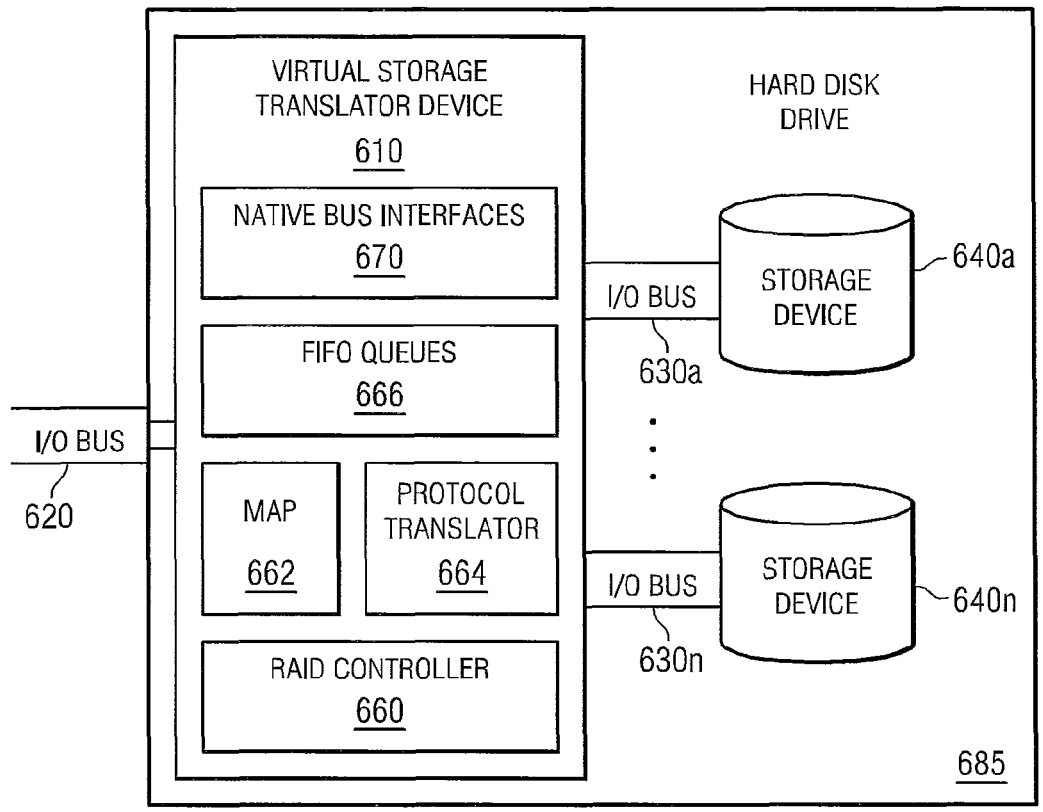
FIG. 4B is a block diagram of one embodiment of a virtual translator storage device and its appearance to a user of a bus.

Advantageously, in one embodiment, to a device utilizing I/O bus 620, it appears that a single storage device is present on I/O bus 620. FIG. 4B is a block diagram of one embodiment of a virtual translator storage device and its appearance to a device coupled to a bus.

Specifically, in one embodiment, it may appear to any device coupled to I/O bus 620 which may issue commands, receive responses or otherwise communicate over I/O bus 620 that a hard disk drive 685 is present on I/O bus 620. In other words, in one embodiment, virtual storage translator device 610 and associated storage media 640 may function unbeknownst to, or without affecting, other devices coupled to or using I/O bus 620. Thus, the ability to store critical data on a particular storage device 640 or other capabilities offered by virtual storage translator device 610 may be obtained substantially without alterations to any of the other hardware or software of systems with which it utilized, and to that hardware or software it appears only that a single hard disk drive 685 is present on the I/O bus 620.

Figure 5:
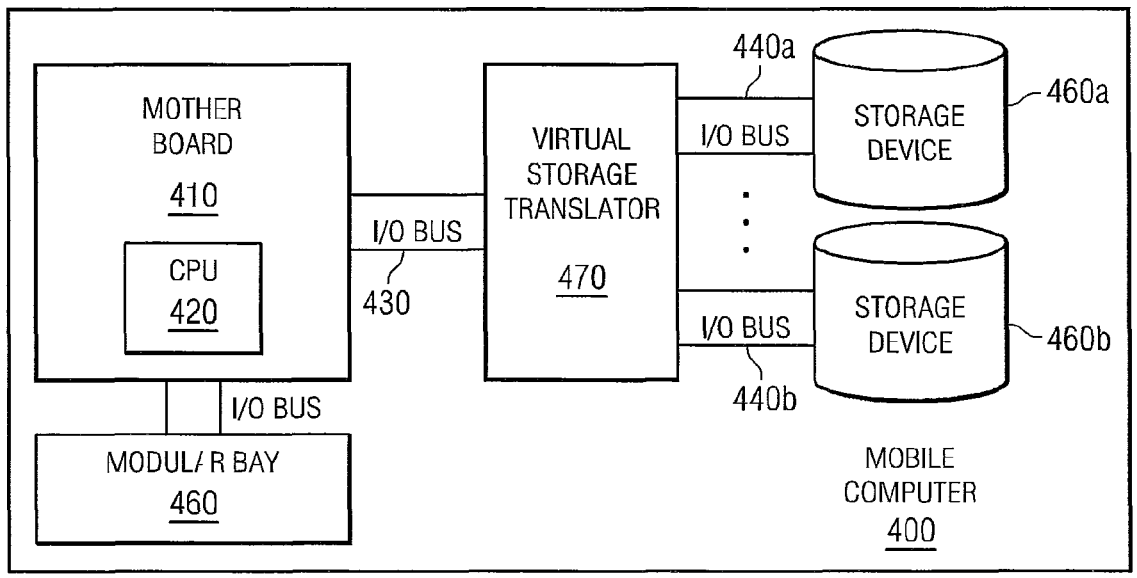
FIG. 5 is a block diagram of one embodiment of the use of a virtual translator storage device.

The functionality of an embodiment of a virtual storage translator device may be better depicted with reference to FIG. 5 which depicts a block diagram of the use of an embodiment of a virtual storage translator device in a mobile computing environment. Mobile computer 400 comprises a mother board 410 with a Central Processing Unit (CPU) 420 where the mother board is coupled to virtual storage translator device 470 through an primary I/O bus 430, such as a SATA, PATA or other type of bus. Virtual translator storage device 470 is, in turn, coupled to each of storage devices 460 using a corresponding secondary I/O bus 440, which may also be SATA or other type of bus. One of storage devices 460a may be of a first type of storage media such as a disk drive while another of the storage devices 460b may be of a second type of storage media such as solid state storage.

Virtual translator storage device 470 may simulate a single drive which is the combined size of storage device 460 by performing or executing the commands received on primary I/O bus 420 utilizing storage devices 430. In addition, virtual translator storage device 470 may ensure that certain designated data is stored on a particular one of the storage devices 460.

In this embodiment, two storage devices 460 of different types may be utilized in conjunction with an I/O bus 420 designed to interface with only a single storage device and designated data may be stored on one of the storage devices 460 such that certain data may be stored on a storage device 460 which provides more reliable storage of such data, without altering the BIOS or other software executing in conjunction with the mobile computer 400. In fact, to an operating system 400 executing on mobile computer (e.g. executing on CPU of mother board 410) it appears as if a single storage device (e.g. hard disk drive, etc.) is present on I/O bus 410.

As can be seen then, storage capacity corresponding to I/O bus 410 may effectively be increased and the reliability of critical data improved without any substantial alteration to the hardware or software of mobile computer 410 relative to coupling only a single storage device to I/O bus 410. In other words, no matter the size of a single storage device which can be coupled to I/O bus, this size can be effectively increased and the storage of critical data on reliable storage devices achieved by attaching multiple storage devices of different types to virtual translator storage device 420.

Figure 7A:
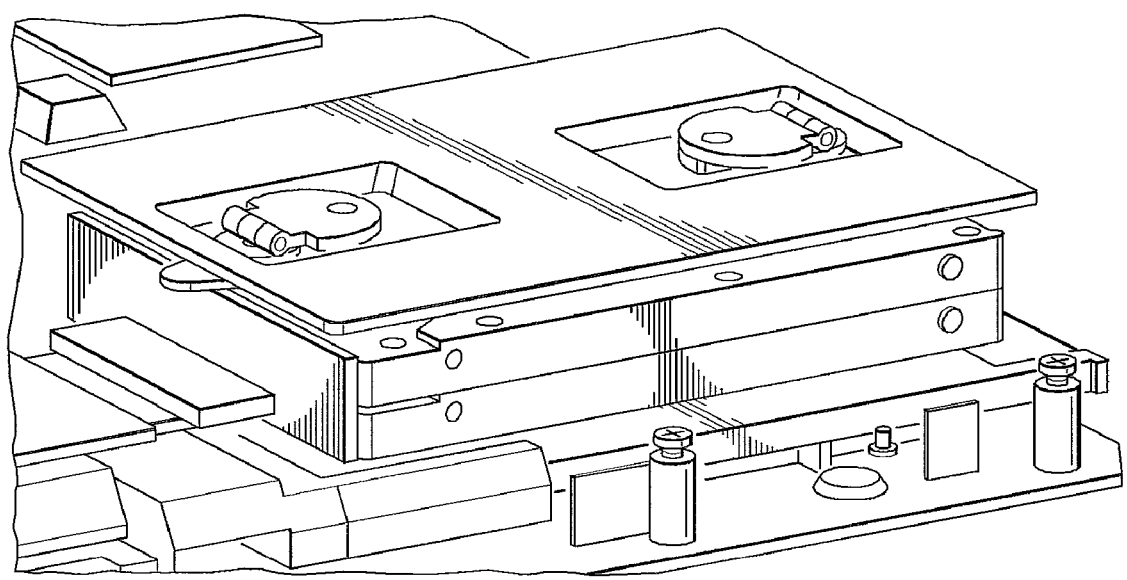
FIGS. 7A and 7B are block diagrams of the footprint of one embodiment of using a virtual translator storage device in conjunction with two storage devices.
Figure 7B:
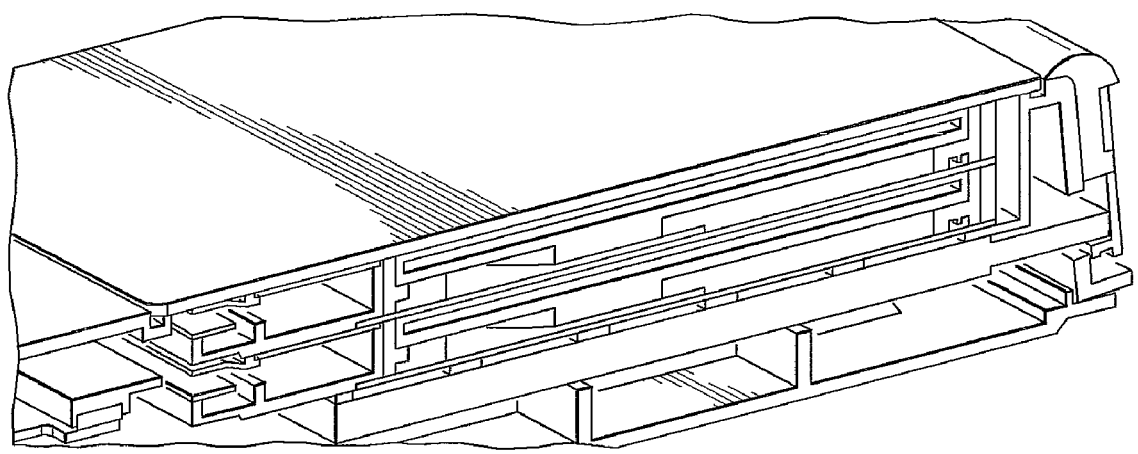

In certain embodiments, in fact, the use of two drives may occupy the same, or close to the same, footprint as the use of a single storage device. This can be seen with brief reference to FIGS. 7A and 7B which depict two views of the use of two storage devices in a mobile environment. As can be seen with reference to these FIGURES, in one embodiment, the two storage devices are configured to fit within the physical parameters of a mobile computer which may have been designed to be utilized with a single storage media.

Returning now to FIG. 5, as discussed above, storage devices 460 used with embodiments of a virtual translator storage device 470 may be any type of storage devices known in the art, such as spinning media or disk drives, solid state hard drives, optical drives, etc. As may be realized each of these various types of storage devices may have different strengths or weaknesses. For example, spinning media drives may have a higher capacity than solid state hard drives while being susceptible to failure when subject to excessive shock or vibration while conversely solid state media drives may be of comparatively lesser capacity while being more resistant to shock or vibration.

When only a single storage device is utilized in a mobile environment the advantages and disadvantages of the particular type of storage device utilized must be dealt with: if a solid state drive is chosen more resistance to shock and vibration is achieved at the expense of capacity, while if a spinning media drive is chosen capacity is gained by sacrificing durability. Using virtual translator storage device 470, however, multiple storage devices may be utilized in conjunction with I/O bus 430 and by utilizing various or different types of storage devices a variety of objectives may be achieved. For example, if storage device 460a is a solid state storage device and storage device 460b is a spinning disk drive the benefits of a solid state drive (e.g. durability, shock resistance, etc.) may be obtained while simultaneously realizing the benefits of a spinning disk drive (e.g. capacity).

To accentuate the advantages of utilizing different types of storage device in conjunction with virtual translator storage device 470 it may be desired to designate where (e.g. on which storage device 460) certain data is stored. For example, it may be useful to store critical or important data on a solid state storage device to protect against loss of this data as these devices are more resistant to shock and vibration. By the same token it may be useful to store non-critical or less important data on a spinning media drive such that the relatively more limited capacity of a solid state storage device is not utilized to store such non-critical data.

Thus, in one embodiment a utility or application 414 may be provided in conjunction with mobile computer 400 (e.g. which may execute on, or utilized with other software such as an operating system or the like on, mobile computer 400) which allows data (e.g. files, directories, etc.) to be designated as critical (or non-critical). Based on a designation associated with data virtual storage translator device 470 may store the data on an appropriate storage device 460. For example, if a file is designated as critical it may be stored on a solid state storage device 460 while if the file is designated as non-critical (or is not designated as critical) the file may be stored on a spinning storage device 460. Again, the storage of data to an appropriate or designated storage device may be accomplished by virtual storage translator device 470 invisible to a user or the hardware or software of mobile computer 400.

Figure 10:
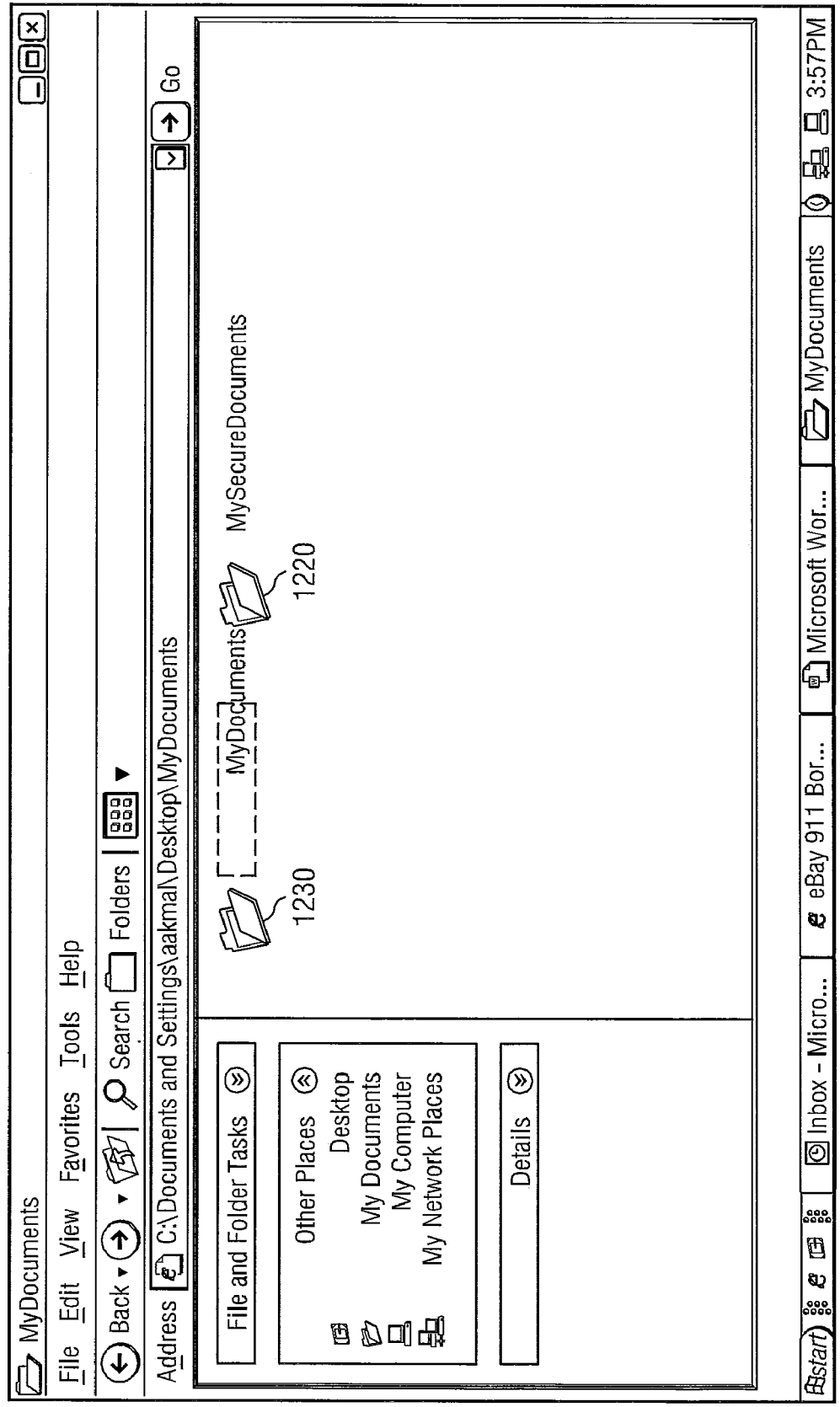
FIG. 10 is a block diagram of one embodiment of interface for allowing the designation of critical data.

In one embodiment, storage designation application 414 (for example, a set of computer executable instructions which may be executed by CPU 420) may automatically designate certain files as critical. For example, with brief reference to FIG. 10, in one embodiment a users "MyDocuments" folder 1210 may have two sub-folders, one sub-folder designated "MySecureDocuments" 1220 and one folder designated "MyDocuments" 1230. Files placed within the "MySecureDocuments" folder will be designated by storage designation application 414 as critical and will be stored on an appropriate storage device 460a by virtual translator storage device 470. While files in the "MyDocuments" folder may be stored on another storage device 460b. In this way, two or more storage devices 460 may be used in conjunction with a single I/O bus 430 where one of these storage devices 460 may be a more reliable storage device 460a such as a solid state storage device and the other storage device 460b may be a storage device with more capacity. Thus, a user may gain the benefit of the use of both types of storage devices without having to substantially alter his mobile computer 400 or utilize a modular bay 460.

To inform virtual storage translator storage device 470 that a particular file or folder is to be designated as critical, storage designation application 414 may intercept commands to store critical data to be issued over I/O bus 430 and alter such commands to inform virtual storage translator device 470 that the data is to be stored in critical storage or may independently communicate with virtual translator storage device 470 to communicate which folders or files are to be stored on a particular storage device 460.

Figure 6:
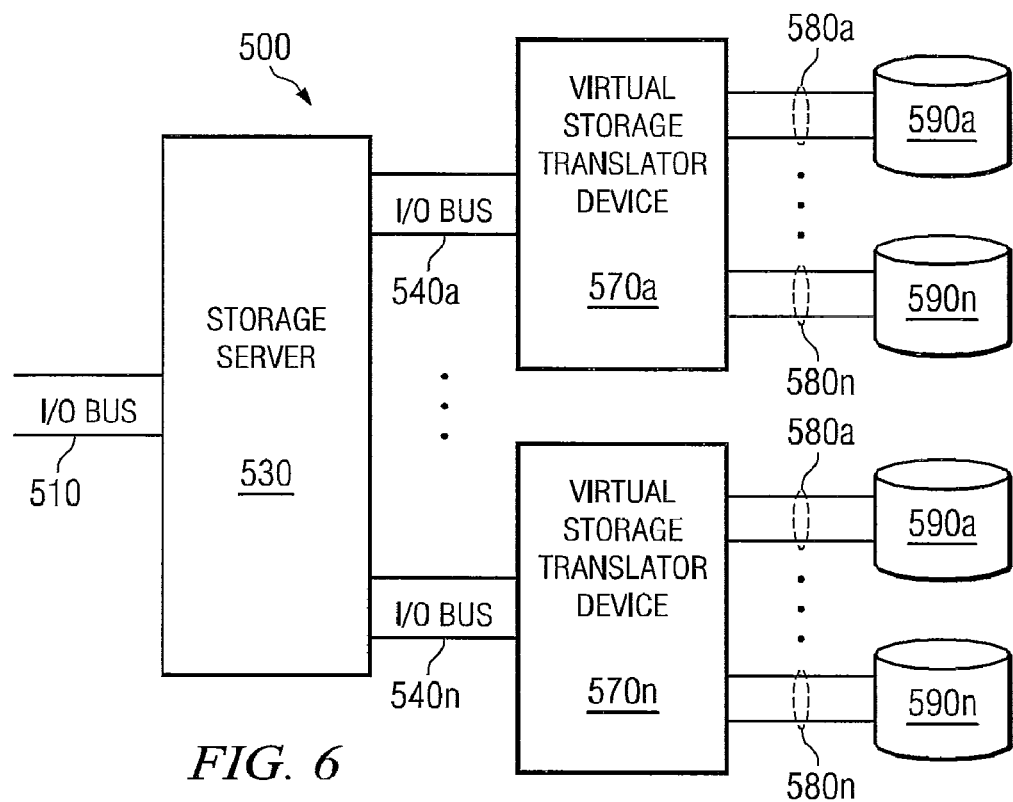
FIG. 6 is a block diagram of one embodiment of the use of a virtual translator storage device.

Similar efficacy and advantages may be achieved by embodiments of a virtual translator storage device in other settings, including those which are not mobile in nature, such as other types of personal or other computing devices. To explain more clearly attention is now directed to FIG. 6 which depicts a block diagram of the use of an embodiment of a virtual storage translator device in a storage server setting. Storage system 500 comprises a storage server 530 (e.g. an enterprise server, a storage server, an NFS server, a storage router in a SAN or NAS, etc.) which receives commands or instructions from one or more hosts (not shown) over I/O bus 510, which may be a serial or other type of bus. Storage server 530 may, in turn, interface with one or more I/O buses 580 each operable to interface with a storage device. Each of these I/O buses 540 is coupled to an embodiment of a virtual translator storage device 570. Virtual translator storage device 570 is coupled to a set of corresponding storage devices 590 using a set of corresponding I/O bus 580 (e.g. each storage device 590 corresponding to a virtual translator storage device 570 is coupled to that virtual translator storage device 570 through a corresponding I/O bus 580). One of each storage devices 590 may be of a first type of storage media such as a disk drive while another of the storage devices 590 may be of a second type of storage media such as solid state storage.

Each of virtual translator storage devices 570 simulates a single storage device which is the combined size of storage devices 590 corresponding to that virtual translator storage device 570 by performing or executing the commands received on corresponding I/O bus 540 utilizing storage devices 590 (as discussed above). In addition, each virtual translator storage device 570 may ensure that certain designated data is stored on a particular one of the attached storage devices 590.

In other words, in this embodiment, multiple storage devices 590 may be utilized in conjunction with I/O buses 540 designed to interface with only a single storage device and designated data may be stored on one of the storage devices 590 such that certain data may be stored on a storage device 590 which provides more reliable storage of such data, without altering the software or hardware executing in conjunction with storage server 530. In fact, to the hardware or software of storage sever 530 it appears as if a single storage device (e.g. hard disk drive, etc.) is present on each of I/O buses 540.

As can be seen then, storage capacity corresponding to I/O bus 540 may effectively be increased and the reliability of critical data improved without any substantial alteration to the hardware or software of storage server 530 relative to coupling only a single storage device to each of I/O buses 540. Specifically, no matter the capacity of a single storage device which can be coupled to I/O bus 540, this capacity can be effectively increased and the storage of critical data on reliable storage devices achieved by attaching multiple storage devices of different types to single I/O bus 540.

In addition to RAID functionality, other forms of functionality may be implemented with respect to embodiments of a virtual translator storage device. In one embodiment, this functionality may include performing encryption on the data stored on one or more of the storage devices associated with the virtual translator storage device. Encrypting data in conjunction with an embodiment of the virtual translator storage device may increase performance of a system with which a virtual translator storage device is utilized (e.g. because no bandwidth is consumed by the operating system for encrypting and decrypting) while simultaneously eliminating a security risk (a compromised operating system or stored data). In a notebook computer setting encrypting at the device level is extremely important for removable storage devices as these devices may frequently be misplaced, stolen or otherwise accessed by unauthorized persons. In the same vein, embodiment of the virtual storage translation device may allow all data on a storage device to be fully encrypted (as opposed to the storage device containing a mix of encrypted and non-encrypted data). A fully encrypted drive provides a greater level of security than a drive that contains non-encrypted and encrypted data.

Figure 8:
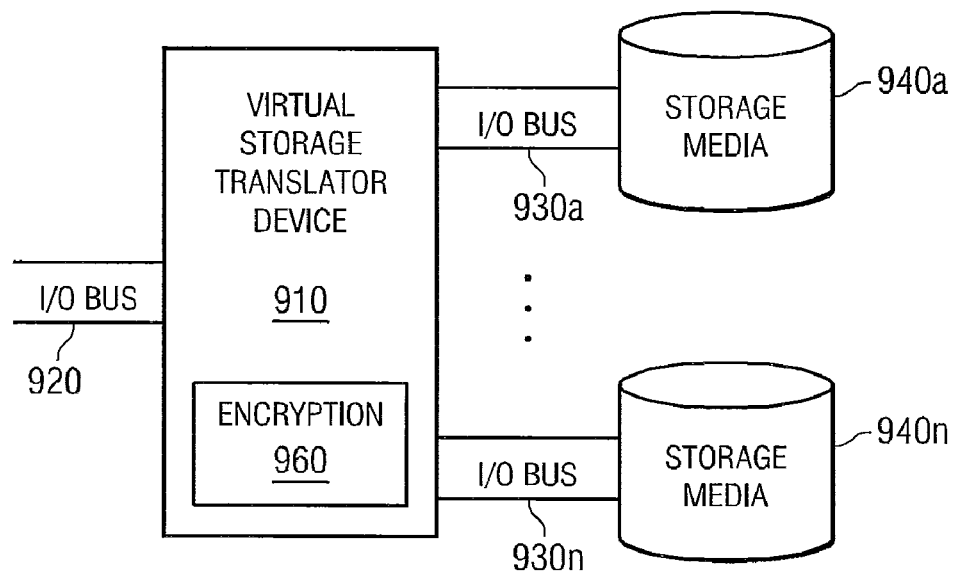
FIG. 8 is a block diagram of one embodiment of a virtual translator storage device.

Turning to FIG. 8, a block diagram for one embodiment of a system for interfacing multiple buses with a single bus is depicted, where encryption may be implemented with respect to data stored on one or more of the storage devices on these multiple buses. More specifically, virtual storage translator device 910 may allow a primary I/O bus 920 to be interfaced with multiple secondary I/O buses 930. Virtual storage translator device 910, includes encryption logic 960 which may be hardware (e.g. on an ASIC), a portion of the hardware or ASIC comprising virtual storage translator device 910, computer readable instructions on a computer readable media, or some combination. Encryption logic 960 may be operable to implement apply one or more encryption algorithms to data being stored to, or retrieved from, storage devices 940 to encrypt according to established standards such as SSL, it could provide low-level whole or partial encryption of a storage device, or it some other function involving an encryption algorithm.

Thus, virtual storage translator device 910 may be operable to receive commands or instructions on primary I/O bus 920 and translate these commands or instructions such that they are effectuated with respect to storage device 940 on secondary I/O buses 930. Additionally, virtual storage translator device 910 is operable to apply encryption logic 960 to any data being stored or retrieved from one or more of these storage devices 940, such that data may be stored on one or more storage device 940 in an encrypted format. As this encryption may take place in virtual storage translator device 910, the encryption process may be more secure than a similar encryption process which is accomplished at the operating system or application level. As will be apparent then, in certain cases, not only may critical data be stored on a suitable storage device 940, but in addition the stored critical data on the suitable storage device 940 may be encrypted.

As a large degree of functionality has been discussed herein in conjunction with embodiments of a virtual translator storage device it should be pointed out that almost any permutation of embodiments of functionalities discussed herein may be implemented. For example, multiple virtual translator storage devices may be cascaded to achieve varying effects, RAID may be implemented with respect to none or all of the virtual translator storage devices in a particular system, different types of storage devices may be utilized in conjunction with virtual translator storage devices, RAID may be implemented with varying types of storage devices and hardware encryption may be utilized on one or more of these storage devices, etc.

Figure 9:
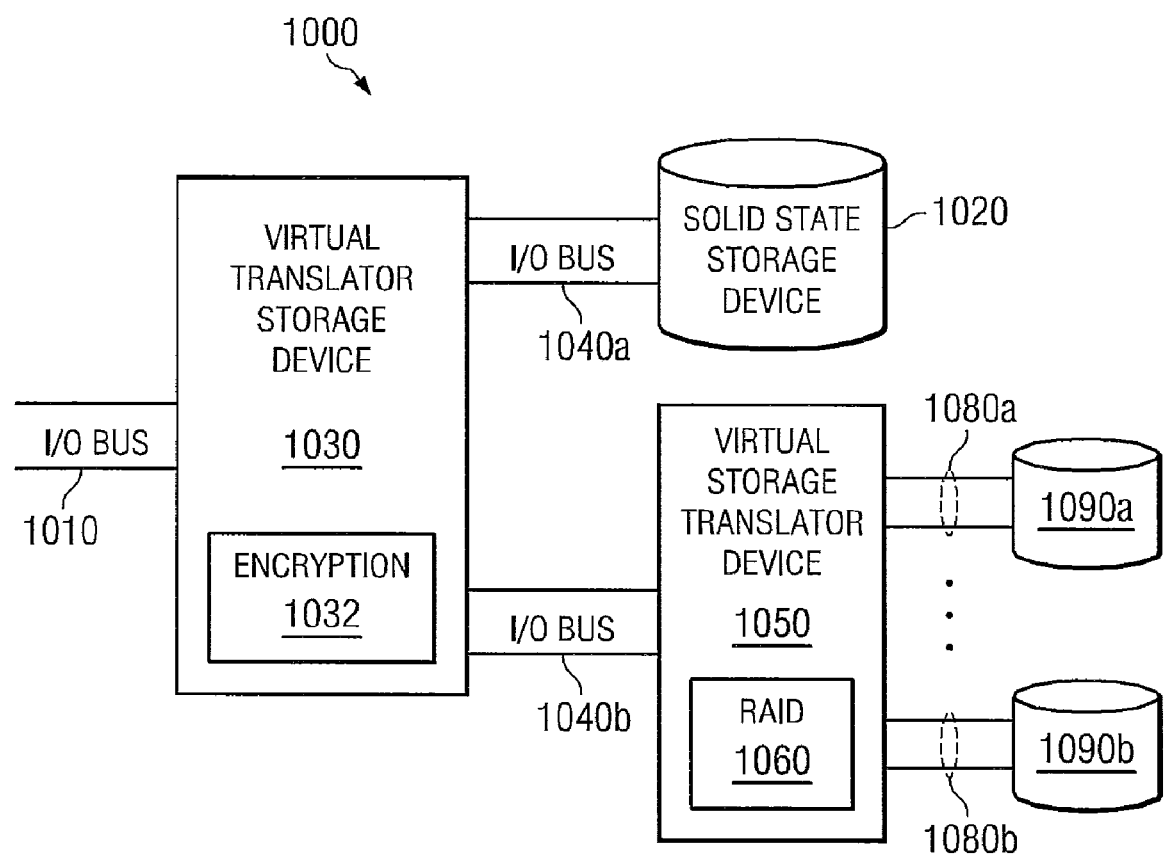
FIG. 9 is a block diagram of one embodiment of the use of a virtual translator storage device.

Examples of such permutations may be better explained with reference to FIG. 9 which depicts one example of an implementation of the use of virtual translator storage devices. As discussed above virtual storage translator device 1030 may allow a primary I/O bus 1010 to be interfaced with multiple secondary I/O buses 1040. Here, secondary I/O bus 1040*a* may be coupled to a solid state storage device 1020 while secondary I/O bus 1040*b* is coupled to another virtual translator storage device 1050 which is, in turn, coupled to tertiary I/O buses 1080, each tertiary I/O bus 1080 coupled to a respective storage device 1090 which may be, for example, a spinning storage device or the like.

During operation of system 1000 virtual translator storage device 1030 may store data which has been designated as critical on solid state storage device 1020. Additionally, virtual translator storage device 1030 may use encryption circuitry or software 1032 to encrypt this critical data. Thus, all data designated as critical may be stored on solid state storage device 1020 in an encrypted form by virtual translator storage device 1030.

Similarly, virtual translator storage device 1030 may send commands or instructions to store non-critical data over I/O bus 1040*b* (without applying any encryption to the non-critical data). These commands or instructions may be received at virtual translator storage device 1050 which may utilize RAID controller 1060 to implement RAID with respect to storage devices 1090, for example RAID level 1 or another level. In this manner, critical data may be protected by storing it in an encrypted format on solid state storage device 1020, while greater capacity may be provided for storing non-critical data on storage device 1090 or non-critical data may be protected using the redundancy or fault tolerance provided by RAID implemented by virtual translator storage device 1050.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, it will be noted that many other permutations of use of embodiments of a virtual translator storage device may be implemented.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A device, comprising:
a first interface operable to interface with a first I/O bus of a computing device utilizing a first protocol;
a second interface operable to interface with a plurality of second I/O buses utilizing a second protocol;
a controller comprising one or more queues operable to store commands received on the first I/O bus in a first protocol associated with the first bus and a translator operable to configure a communication in the first protocol or the second protocol wherein the controller is operable to store data designated as critical on a first storage media of a first size coupled to a first one of the plurality of second I/O buses, store data not designated as critical by a user on a second storage media of a second size coupled to a second one the plurality of second I/O buses and the device appears as a single storage device of the combined first and second sizes to the computing device on the first I/O bus, wherein data is designated as critical by the user storing of the data in a first folder using the computing device and data is designated as not critical by the user storing the data in a second folder using the computing device.

2. The device of claim 1, wherein the first storage media is a solid state storage media.

3. The device of claim 2, wherein the second storage media coupled to the second I/O bus of the plurality of second I/O buses is a disk drive.

4. The device of claim 3, further comprising a computer readable medium comprising a set of instructions operable to allow a user to designate data as critical.

5. The device of claim 4, wherein the device is used with a computing device comprising the computer readable medium.

6. The device of claim 4, wherein the controller further comprise a map operable to map an address in commands received on the first I/O bus to one or more addresses corresponding to the first storage media coupled to the first one of the plurality of second I/O buses or the second storage media coupled to the second one of the plurality of second I/O buses.

7. The device of claim 6, wherein the controller is operable to determine if the address in commands received on the first I/O bus corresponds to data designated as critical.

8. The device of claim 7, wherein the first I/O bus and the plurality of second I/O buses are a SATA, PATA, SCSI, or FC bus.

9. The device of claim 1, further comprising encryption logic operable to implement one or more encryption algorithms in conjunction with the first storage media or second storage media.

10. A method of interfacing buses using a device, comprising receiving a first command on a first I/O bus of the device utilizing a first protocol, wherein the device comprises a plurality of second I/O buses utilizing a second protocol, a first storage media of a first size coupled to a first one of the plurality of second I/O buses and a second storage media of a second size coupled to a second one the plurality of second I/O buses;

storing the first command in one or more queues operable to store commands received on the first I/O bus;

translating the first command to one or more second commands operable to implement the first command utilizing a second protocol such that the device appears as a single storage device of the combined first and second sizes to a computing device on the first I/O bus, wherein if the first command corresponds to data designated as critical the one or more second command are operable to utilize the first storage media if the first command corresponds to data not designated as critical by a user the one or more second commands are operable to utilize the second storage media of a second size coupled to a second one the plurality of second I/O buses and wherein data is designated as critical by the user storing of the data in a first folder using the computing device and data is designated as not critical by the user storing the data in a second folder using the computing device.

11. The method of claim 10, wherein the first storage media is a solid state storage media.

12. The method of claim 11, wherein the second storage media coupled to the second I/O bus of the plurality of second I/O buses is a disk drive.

13. The method of claim 12, further comprising allowing a user to designate data as critical.

14. The method of claim 13, further comprising mapping an address in the first command received on the first I/O bus to one or more addresses corresponding to the first storage media or the second storage media coupled to the plurality of second I/O buses.

15. The method of claim 14, further comprising determining if the address in commands received on the first I/O bus corresponds to data designated as critical.

16. The method of claim 15, wherein the first I/O bus and the plurality of second I/O buses are a SATA, PATA, SCSI, or FC bus.

17. The method of claim 15, further comprising encrypting data in conjunction with the first storage media or the second storage media.

* * * * *